(12) United States Patent
Wirrick

(10) Patent No.: US 11,826,972 B2
(45) Date of Patent: Nov. 28, 2023

(54) MOLDED LAMINATED STRUCTURE WITH NEGATIVE DRAFT ANGLES AND ASSOCIATED METHODS OF MANUFACTURING

(71) Applicant: The Boeing Company, Chicago, IL (US)

(72) Inventor: Jeffrey Wirrick, Mill Creek, WA (US)

(73) Assignee: The Boeing Company, Arlington, VA (US)

( * ) Notice: Subject to any disclaimer, the term of this patent is extended or adjusted under 35 U.S.C. 154(b) by 197 days.

(21) Appl. No.: 17/350,867

(22) Filed: Jun. 17, 2021

(65) Prior Publication Data

US 2021/0308970 A1    Oct. 7, 2021

Related U.S. Application Data

(62) Division of application No. 16/781,640, filed on Feb. 4, 2020, now Pat. No. 11,077,630.

(51) Int. Cl.
*B29C 53/06*       (2006.01)
*B32B 3/12*        (2006.01)
(Continued)

(52) U.S. Cl.
CPC ............ *B29C 70/545* (2013.01); *B29C 53/06* (2013.01); *B29C 53/066* (2013.01);
(Continued)

(58) Field of Classification Search
CPC ....... B29C 53/005; B29C 53/02; B29C 53/04; B29C 53/06; B29C 53/063; B29C 53/066; B29C 66/0224; B29C 66/02241; B29C 66/72525; B29C 66/7254; B29C 69/001; B29C 70/30; B29C 70/545; B29C 70/68; B29C 70/682; B29C 2793/0054; B29C 2793/0072; B29C 2793/0081; B29C 2793/009; B29D 99/0003; B29K 2309/08; B29L 2031/608; B29L 2031/3076; B32B 1/00; B32B 3/12; B32B 3/30; B32B 5/02;
(Continued)

(56) References Cited

U.S. PATENT DOCUMENTS 3,969,868 A * 7/1976 Bainter .................. B62D 29/04
                                                    428/167
6,164,477 A    12/2000 Druckman et al.
(Continued)

*Primary Examiner* — Michael A Tolin
(74) *Attorney, Agent, or Firm* — Kunzler Bean & Adamson

(57) ABSTRACT

Disclosed herein is a molded laminated structure having negative draft angles and methods of manufacturing a molded laminated structure having negative draft angles. A preliminary structure having a first outer layer and a second outer layer is molded with a bend that divides the preliminary structure into two sections with an angle between the two sections of less than 180-degrees. Portions that extends from the sections are at positive draft angles. A groove is formed in the preliminary structure at the bend but not formed in a constant cross-section of the second outer layer. The preliminary structure is folding along the bend to at least partially close the groove and form a molded laminated structure with portions that extend at a negative draft configuration while retaining the second outer layer continuous throughout the molded laminated structure.

20 Claims, 10 Drawing Sheets

(51) Int. Cl.
 *B64D 11/00* (2006.01)
 *B29C 70/54* (2006.01)
 *B29C 70/30* (2006.01)
 *B29C 70/68* (2006.01)
 *B32B 27/06* (2006.01)
 *B29C 65/00* (2006.01)
 *B29K 309/08* (2006.01)
 *B29L 31/30* (2006.01)
 *B29L 31/60* (2006.01)

(52) U.S. Cl.
 CPC .... *B29C 66/02241* (2013.01); *B29C 66/7254* (2013.01); *B29C 70/30* (2013.01); *B29C 70/682* (2013.01); *B32B 3/12* (2013.01); *B32B 27/06* (2013.01); *B29C 2793/0054* (2013.01); *B29C 2793/0072* (2013.01); *B29K 2309/08* (2013.01); *B29L 2031/3076* (2013.01); *B29L 2031/608* (2013.01); *B32B 2262/101* (2013.01); *B32B 2305/024* (2013.01); *B32B 2605/18* (2013.01); *B64D 11/003* (2013.01)

(58) Field of Classification Search
 CPC ........... B32B 5/26; B32B 27/06; B32B 27/08; B32B 27/12; B32B 27/38; B32B 27/42; B32B 37/146; B32B 38/0004; B32B 2250/03; B32B 2260/023; B32B 2260/046; B32B 2262/101; B32B 2262/106; B32B 2305/024; B32B 2307/732; B32B 2605/18; B64C 1/066; B64D 11/003; B64F 5/10
 See application file for complete search history.

(56) References Cited

U.S. PATENT DOCUMENTS

| | | |
|---|---|---|
| 7,887,249 B2 | 2/2011 | Schmitz |
| 8,234,901 B2 | 8/2012 | Lewis et al. |
| 8,419,876 B1 | 4/2013 | Harris |
| 9,205,616 B2 | 12/2015 | Young et al. |
| 2016/0089829 A1* | 3/2016 | Derkman ............... B65D 25/10 264/48 |

* cited by examiner

MOLDED LAMINATED STRUCTURE WITH NEGATIVE DRAFT ANGLES AND ASSOCIATED METHODS OF MANUFACTURING

FIELD

The disclosure relates generally to a structure having negative draft angles and a method of manufacturing a structure having negative draft angles. More particularly, the disclosure relates to a molded laminated structure having negative draft angles and a method of manufacturing a molded laminated structure having negative draft angles.

BACKGROUND

Modern aircraft are being designed and manufactured to have a greater number of laminated structures than older aircraft. Typically, laminated structures include thin sheets of material in a stacked configuration and bound together by an adhesive. Some laminated structures are made from curable polymeric materials and are formed by applying heat and/or pressure treatment to cure the polymeric materials and permanently form the laminated structures into a desired shape. Aircraft parts made from laminated structures are particularly advantageous because of their high strength and relatively low weight.

Some laminated structures form a honeycomb sandwich panel that includes a honeycomb core with a face sheet on either or both sides of the honeycomb core. The face sheet(s) may be made from a single component material or a composite material, such as a fiber-reinforced polymeric material. Some honeycomb sandwich panels are used as interior parts of an aircraft. For example, certain honeycomb sandwich panels form part or all of the walls, flooring, overhead bins, light covers, arm rests, and other suitable structures on the interior of an aircraft. Because many interior parts are viewable by passengers, making the surfaces of the parts aesthetically pleasing (e.g., without visible joint or bond lines) is often desirable.

In some cases, laminated structures have features that form negative draft angles. A limitation of conventional molding, in which the molding member is reused, is that only structures having positive draft angles can be produced by the molding member. Draft, in the molding art, refers to the angle of one portion of a molded structure relative to another portion. A positive draft allows the molded structure to be separated from the mold without breaking, cutting or otherwise distorting the mold or molded structure. More specifically, angled portions that define a relative angle greater than 90 degrees, which allows for separation or removal of the molded structure from the mold, define a positive draft. A molded structure having angled portions that all define positive drafts allow removal of the structure from a mold without destruction of either the mold or the molded structure.

Contrary to positive drafts, multiple negative drafts in a molded structure make it virtually impossible to remove the molded structure from a mold. Accordingly, molded structures with multiple negative draft angles are currently manufactured in multiple pieces using multiple-piece molds. Each piece of the multiple-piece structure is separately molded to have only positive draft angles or a single negative draft angle and thus be capable of being released from a mold. The separate pieces are then manually joined together, along one or more bond lines of splicing joints using a bonding, adhesive, or potting material, to form a structure with the desired negative draft angles. Such a process, commonly referred to as splicing, tends to be time-consuming and tedious. For example, bonding multiple separate pieces together perfectly can be difficult. Often, the pieces are out of alignment at the splicing joint, creating an uneven surface. The uneven surface must have a filler material applied and sanded to smooth the surface of the part along the splicing joint. As mentioned, this process is time-consuming, messy, and difficult. Furthermore, the resulting structure, being a bonded collection of multiple entirely separately-formed pieces, can be weak and prone to breakage, particularly at the bond lines.

SUMMARY

The subject matter of the present invention provides examples of molded laminated structures and methods of manufacturing a molded laminated structure that overcome at least one of the above-discussed shortcomings of prior art techniques. There is a desire to manufacture molded laminated structures with negative draft angles in a more efficient manner while improving the strength of the structures. Accordingly, the subject matter of the present application has been developed in response to the present state of the art, and in particular, in response to shortcomings of conventional molded laminated structures with negative draft angles and conventional methods of manufacturing such molded laminated structures.

Disclosed herein is a molded laminated structure. The molded laminated structure comprises a first outer layer, defining a first outer surface, and a second outer layer, defining a second outer surface. The first outer surface is opposite the second outer surface. The molded laminated structure also comprises an intermediate portion. A first portion extends from the intermediate portion at a first negative draft angle relative to a horizontal plane and a second portion extends from the intermediate portion towards the first portion at a second negative draft angle relative to the horizontal plane. The first portion and the second portion are at opposite ends of the intermediate portion and the first portion extends towards the second portion. The molded laminated structure further comprises a groove formed in the first outer layer and extending across an entirety of intermediate portion along a folding joint between the first portion and the second portion. The groove is not formed in a constant cross-section of the second outer layer such that the second outer layer is continuous across a constant cross-section of the intermediate portion along the groove. The molded laminated structure additionally comprises an adhesive that fills the groove. The preceding subject matter of this paragraph characterizes example 1 of the present disclosure.

The groove further comprises a first wall that extends from the first outer surface and through the first outer layer. The groove also comprises a second wall that is opposite the first wall and extends from the first outer surface and through the first outer layer. The groove further comprises an exposed section of the second outer layer between the first wall and the second wall. The preceding subject matter of this paragraph characterizes example 2 of the present disclosure, wherein example 2 also includes the subject matter according to example 1, above.

The molded laminated structure further comprises a notch which is formed in the second outer surface and extends across an entirety of the intermediate portion along the folding joint. The molded laminated structure also comprises a filler material within the notch. The preceding subject matter of this paragraph characterizes example 3 of the present disclosure, wherein example 3 also includes the subject matter according to example 2, above.

The molded laminated structure further comprises a honeycomb core which is interposed between the first outer layer and the second outer layer. The preceding subject matter of this paragraph characterizes example 4 of the present disclosure, wherein example 4 also includes the subject matter according to any one of examples 1-3, above.

The first outer layer and the second outer layer of the molded laminated structure each comprises a glass-fiber-reinforced polymeric material. The preceding subject matter of this paragraph characterizes example 5 of the present disclosure, wherein example 5 also includes the subject matter according to any one of examples 1-4, above.

The second outer layer of the molded laminated structure comprises four or less plies of glass-fiber-reinforced polymeric material. The preceding subject matter of this paragraph characterizes example 6 of the present disclosure, wherein example 6 also includes the subject matter according to example 5, above.

The first outer layer and the second outer layer of the molded laminated structure each comprises a carbon-fiber-reinforced polymeric material. The preceding subject matter of this paragraph characterizes example 7 of the present disclosure, wherein example 7 also includes the subject matter according to any one of examples 1-4, above.

The molded laminated structure is an aircraft structure. The preceding subject matter of this paragraph characterizes example 8 of the present disclosure, wherein example 8 also includes the subject matter according to any one of examples 1-7, above.

Further disclosed herein is a method of manufacturing a molded laminated structure. The method comprises molding a preliminary structure. The preliminary structure comprises a first outer layer, defining a first outer surface, and a second outer layer, defining a second outer surface. The first outer surface is opposite the second outer surface. An intermediate portion comprises a bend that divides the intermediate portion into a first section and a second section. The first section, proximate the bend, is angled relative to the second section, proximate the bend, such that the second outer surface of the first section defines an angle with the second outer surface of the second section that is less than 180-degrees. A first portion extends from the first section at a first positive angle relative to a horizontal plane and a second portion extends from the second section away from the first portion at a second positive angle relative to the horizontal plane. The first portion extends away from the second portion. The method also comprises machining a groove into the first outer layer that extends across an entirety of the intermediate portion along the bend. The groove is not formed in a constant cross-section of the second outer layer such that the second outer layer is continuous across a constant cross-section of the intermediate portion along the groove. The method additionally comprises filling the groove with an adhesive. The method further comprises folding the intermediate portion at the bend to at least partially close the groove such that the first portion extends towards the second portion at a first negative draft angle relative to the horizontal plane and the second portion extends towards the first portion at a second negative draft angle relative to the horizontal plane. The preceding subject matter of this paragraph characterizes example 9 of the present disclosure.

The groove of the preliminary structure has a cross-section along a plane perpendicular to the bend. The cross-section comprises a first wall which extends from the first outer surface and into the first outer layer and a second wall, opposite the first wall, which extends from the first outer surface and into the first outer layer. The cross-section also comprises an exposed section of the second outer layer between the first wall and the second wall. The step of folding the intermediate portion at the bend at least partially closes the groove by folding the first wall towards the second wall and the second wall towards the first wall. The preceding subject matter of this paragraph characterizes example 10 of the present disclosure, wherein example 10 also includes the subject matter according to example 9, above.

The exposed section of the second outer layer between the first wall and the second wall is radiused. The radius of the exposed section is at least 7 times a thickness of the second outer layer. The preceding subject matter of this paragraph characterizes example 11 of the present disclosure, wherein example 11 also includes the subject matter according to example 10, above.

Additionally, the exposed section of the second outer layer between the first wall and the second wall is radiused and the radius of the exposed section is no more than 10 times a thickness of the second outer layer. The preceding subject matter of this paragraph characterizes example 12 of the present disclosure, wherein example 12 also includes the subject matter according to example 10, above.

The method further comprises filling a notch formed in the second outer surface that extends across an entirety of the intermediate portion along the bend with a filler material. The notch is formed in the second outer surface, opposite the exposed section of the second outer layer, during the step of folding the preliminary structure at the bend. The preceding subject matter of this paragraph characterizes example 13 of the present disclosure, wherein example 13 also includes the subject matter according to any one of examples 10-12, above.

The groove of the preliminary structure has a cross-section along a plane perpendicular to the bend that has a first V-shape. The step of folding the intermediate portion at the bend at least partially closes the groove such that the cross-section of the groove has a second V-shape different than the first V-shape, after folding the intermediate portion at the bend. The preceding subject matter of this paragraph characterizes example 14 of the present disclosure, wherein example 14 also includes the subject matter according to any one of examples 9-13, above.

Additionally, further disclosed herein is a method of manufacturing a molded laminated structure. The method comprises molding a preliminary structure. The preliminary structure comprises a first outer layer, defining a first outer surface, and a second outer layer, defining a second outer surface. The first outer surface is opposite the second outer surface. A honeycomb core is interposed between the first outer layer and the second outer layer. An intermediate portion comprises a bend that divides the intermediate portion into a first section and a second section. The first section, proximate the bend, is angled relative to the second section, proximate the bend, such that the second outer surface of the first section defines an angle with the second outer surface of the second section that is less than 180-degrees. A first portion extends from the first section at a first positive angle relative to a horizontal plane and a second portion extends from the second section away from the first portion at a second positive angle relative to the horizontal plane. The first portion extends away from the second portion. The method also comprises machining a groove into the first outer layer that extends across an entirety of the intermediate portion along the bend. The groove is not formed in a constant cross-section of the second outer layer such that the second outer layer is continuous across a constant cross-section of the intermediate portion along the groove. The method additionally includes filling the groove with an adhesive. The method further comprises folding the intermediate portion at the bend to at least partially close the groove such that the first portion extends towards the second portion at a first negative draft angle relative to the horizontal plane and the second portion extends towards the first portion at a second negative draft angle relative to the horizontal plane. The preceding subject matter of this paragraph characterizes example 15 of the present disclosure.

The groove of the preliminary structure has a cross-section along a plane perpendicular to the bend. The cross-section comprises a first wall which extends from the first outer surface, through the first outer layer, and at least partially through the honeycomb core, and a second wall, opposite the first wall, which extends from the first outer surface, through the first outer layer and at least partially through the honeycomb core. The cross-section also comprises an exposed section of the honeycomb core between the first wall and the second wall. The step of folding the intermediate portion at the bend at least partially closes the groove by folding the first wall towards the second wall and the second wall towards the first wall. The preceding subject matter of this paragraph characterizes example 16 of the present disclosure, wherein example 16 also includes the subject matter according to example 15, above.

The method further comprises filling a notch formed in the second outer surface that extends across an entirety of the intermediate portion along the bend with a tiller material. The notch is formed in the second outer surface, opposite the exposed section of the honeycomb core, during the step of folding the preliminary structure at the bend. The preceding subject matter of this paragraph characterizes example 17 of the present disclosure, wherein example 17 also includes the subject matter according to example 16, above.

The exposed section of the honeycomb core between the first wall and the second wall is radiused. The radius of the exposed section is at least 7 times a thickness of the second outer layer. The preceding subject matter of this paragraph characterizes example 18 of the present disclosure, wherein example 18 also includes the subject matter according to any one of examples 16-17, above.

The exposed section of the honeycomb core between the first wall and the second wall is radiused and the radius of the exposed section is no more than 10 times a thickness of the second outer layer. The preceding subject matter of this paragraph characterizes example 19 of the present disclosure, wherein example 19 also includes the subject matter according to any one of examples 16-17, above.

The first outer layer and the second outer layer each comprises a glass-fiber-reinforced polymeric material. The preceding subject matter of this paragraph characterizes example 20 of the present disclosure, wherein example 20 also includes the subject matter according to any of examples 15-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter; they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is a molded laminated structure having negative draft angles and methods of manufacturing a molded laminated structure having negative draft angles. A preliminary structure having a first outer layer and a second outer layer is molded with a bend that divides the preliminary structure into two section with an angle between the two sections of less than 180-degrees. In some examples, all portions that extend from the sections at angles relative to each other define positive draft angles. A groove is formed in the preliminary structure at the bend but not formed in a constant cross-section of the second outer layer. The preliminary structure is then folded along the bend in the second outer layer to form a molded laminated structure with portions that extend at a negative draft configuration while retaining the second outer layer continuous throughout the molded laminated structure. Retaining the second outer layer automatically keeps the two sections in correct orientation to each other during post-molding processing, maintains the strength of the molded structure, and promotes an aesthetically pleasing decorative surface.

Figure 1:
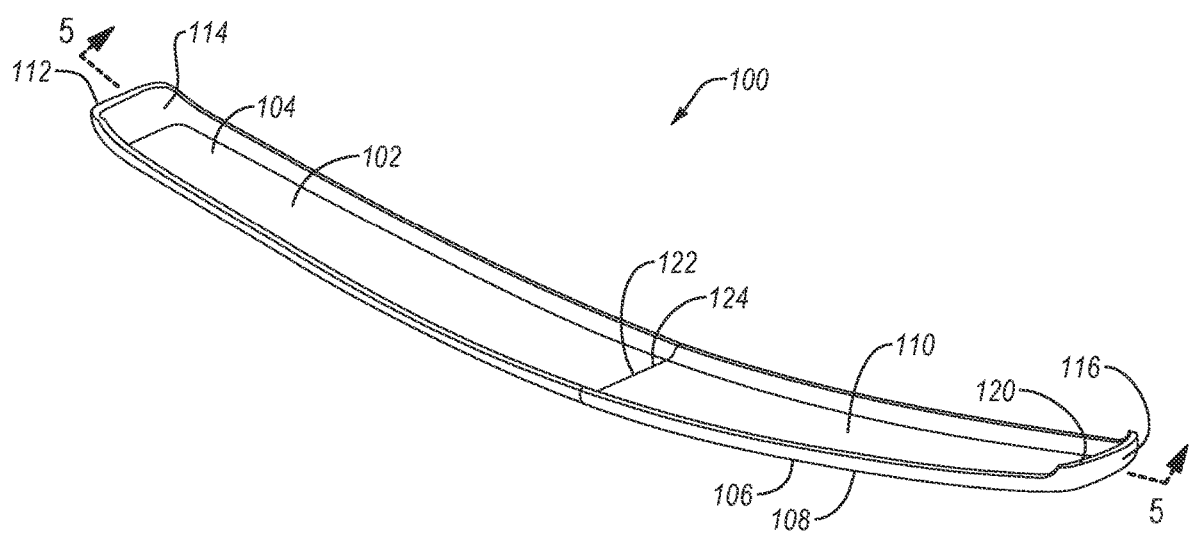
FIG. 1 is a perspective view of a molded laminated structure, according to one or more examples of the present disclosure.
Figure 5:
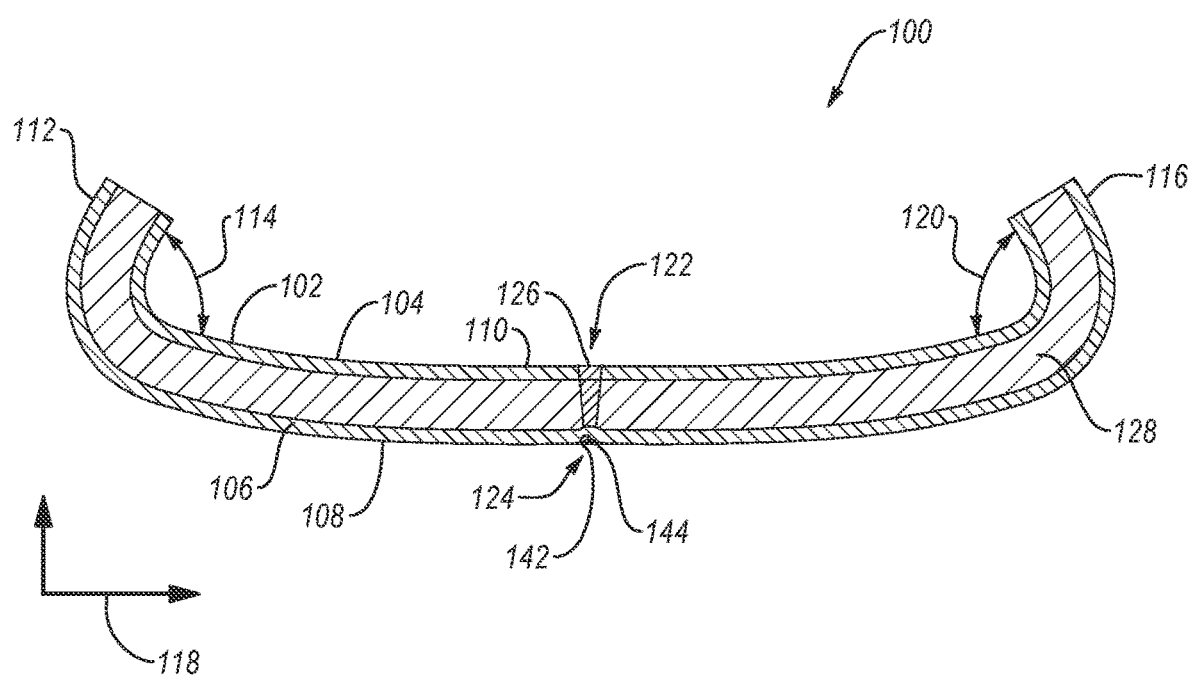
FIG. 5 is a cross-sectional side view of the molded laminated structure of FIG. 1, taken along the line 5-5 of FIG. 1, according to one or more examples of the present disclosure.

Referring to FIG. 1, according to some examples, disclosed herein is a molded laminated structure 100 that includes portions extending from the structure that define negative draft angles with other portions of the laminated structure 100 (or with a horizontal plane 118 (see, e.g., FIG. 5). The molded laminated structure 100 includes a first outer layer 102 which defines a first outer surface 104 and a second outer layer 106 which defines a second outer surface 108. The first outer surface 104 is opposite of the second outer surface 108. In other words, the first outer surface 104 is on an opposite side of the laminated structure 100, across a thickness of the laminated structure 100, than the second outer surface 108. The second outer layer 106 defines an outwardly-facing decorative surface and is visible when the molded laminated structure 100 is installed within a structure, such as an aircraft structure, in some examples.

In certain examples, the first outer layer 102 and the second outer layer 106 are made from a polymeric material. The polymeric material is any of various polymeric materials including, but not limited to, a glass-fiber-reinforced polymeric material 130, a carbon-fiber-reinforced polymeric material, a single component polymeric material (such as a fiberless resin), and/or some other suitable polymeric material. Accordingly, in certain examples, the polymeric material can be a composite material impregnated with resin including, but not limited to, a phenolic resin, an epoxy resin, or some other suitable curable resin.

The molded laminated structure 100 includes an intermediate portion 110, a first portion 112 extending from a first end of the intermediate portion 110, and a second portion 116 extending from a second end of the intermediate portion 110. The second end of the intermediate portion 110 is opposite the first end of the intermediate portion 110. The first portion 112 extends from the intermediate portion 110 at a first negative draft angle 114 relative to the immediate section of the intermediate portion 110 from which the first portion 112 extends. Similarly, the second portion 116 extends from the intermediate portion 110 at a second negative draft angle 120 relative to the immediate section of the intermediate portion 110 from which the second portion 116 extends. In some examples, as shown in FIG. 5, the first portion 112 and the second portion 116 each defines a negative draft angle with a horizontal plane 118. The first portion 112 and the second portion 116 extend uprightly from the same side of the intermediate portion 110 and extend toward each other. In this manner, the molded laminated structure 100 includes two opposing negative draft angles.

The molded laminated structure 100 has a groove 122 formed in, and extending entirely through a thickness of the first outer layer 102 forming the intermediate portion 110. The groove 122 also extends across an entirety of the intermediate portion 110 along a folding joint 124. The folding joint 124 is located between the first portion 112 and the second portion 116. As shown in FIG. 1, the folding joint 124 is equidistant from the first portion 112 and the second portion 116. The folding joint 124 is also shown as being parallel to the first portion 112 and the second portion 116. However, depending on the desired shape and contours of the molded laminated structure 100, the folding joint 124 could be located at any position along the intermediate portion 110 between the first portion 112 and the second portion 116. Additionally, or alternatively, the folding joint 124 could be angled at various degrees (e.g., non-parallel) relative to the first portion 112 and the second portion 116. By changing the location and angle of the folding joint 124, a variety of structures could be molded, rather than the symmetrical structure shown in FIG. 1. Furthermore, a molded laminated structure 100 may have multiple grooves 122 formed in the intermediate portion 110. Multiple grooves could be utilized in order to form a molded laminated structure 100 with more severe contours.

The groove 122 is filled with an adhesive 126 to fill the void in the structure created by the groove 122 and to retain the first portion 112 and the second portion 116 at the first negative draft angle 114 and the second negative draft angle 120, respectively.

In the illustrated examples, the molded laminated structure 100 is an end cap that finishes or caps the end of a run of stowage bins on an aircraft or other mobile platform. However, in other examples, the molded laminated structure 100 can be any of various parts of any of various mobile platforms or non-mobile platforms.

Figure 2:
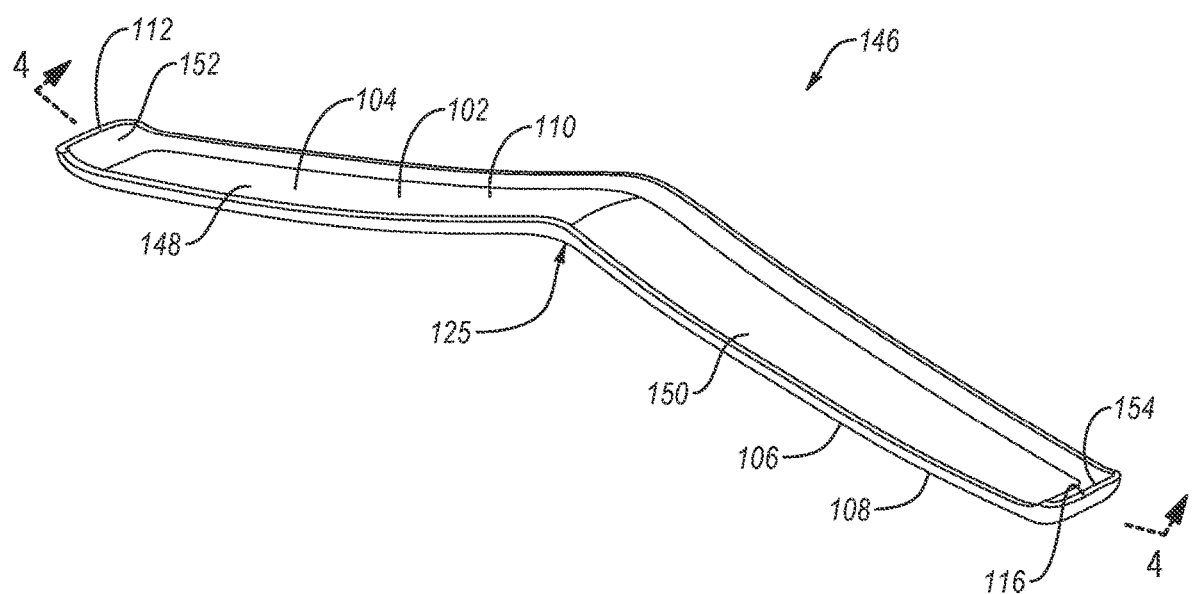
FIG. 2 is a perspective view of a preliminary structure that is formed into the molded laminated structure of FIG. 1, according to one or more examples of the present disclosure.

Referring to FIG. 2, a preliminary structure 146 that is formed into the molded laminated structure 100 is shown. The preliminary structure 146 includes the first outer layer 102, defining the first outer surface 104, and the second outer layer 106, defining the second outer surface 108. As presented above, the first outer surface 104 is opposite the second outer surface 108. The intermediate portion 110 of the preliminary structure 146 has a bend 125 that divides the intermediate portion 110 into a first section 148 and a second section 150. The bend 125 corresponds with and helps form the folding joint 124 of the molded laminated structure 100. The bend 125, as shown in FIG. 2, is located at the midpoint of the intermediate portion 110. Therefore, in the illustrated example of FIG. 2, the first section 148 and the second section 150 have the same length. However, in other examples, the bend 125 could be located at any point along the intermediate portion 110. Although the bend 125 is shown to extend transversely across the intermediate portion 110 parallel to the first portion and the second portion, the bend 125 can be angled, in a similar manner to that of the folding joint 124 described above. Additionally, instead of a single bend 125, the preliminary structure 146 could have multiple bends 125 in the intermediate portion 110, corresponding with multiple folding joints 124, in order to form a more complex final structure.

In view of the foregoing, as used herein, the term "bend" and "folding joint" refer to corresponding features of the intermediate portion 110. The term "bend" is used when referring to the preliminary structure 146 and the term "folding joint" is used when referring to the groove 122.

Figure 4:
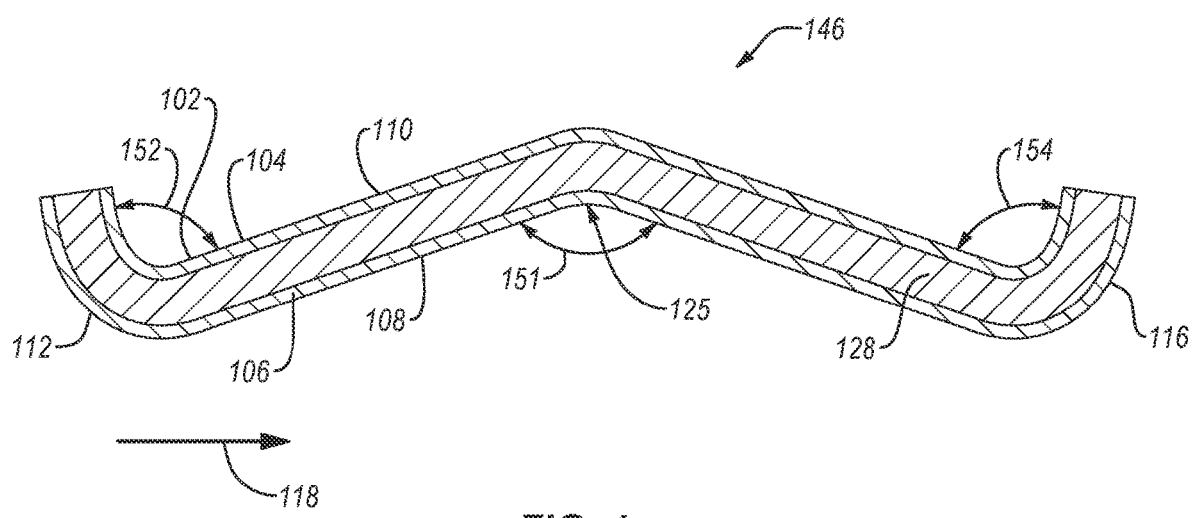
FIG. 4 is a cross-sectional side view of the preliminary structure of FIG. 2, taken along the line 4-4 of FIG. 2, according to one or more examples of the present disclosure.

The first section 148 of the intermediate portion 110 is angled relative to the second section 150 of the intermediate portion 110 proximate to the bend 125. More specifically, referring to FIG. 4, the second outer surface 108 of the first section 148 defines an angle 151 with the second outer surface 108 of the second section 150 that is less than 180-degrees. Consequently, the first outer surface 104 of the first section 148 and the first outer surface 104 of the second section 150 defines an angle that is greater than 180-degrees. As a result of the bend 125 in the intermediate portion 110, the first portion 112 of the preliminary structure 146, extending from the first section 148, is at a first positive draft angle 152 relative to the immediate section of the intermediate portion 110 from which the first portion 112 extends. Furthermore, the second portion 116 of the preliminary structure 146, extending from the second section 150, is at a second positive draft angle 154 relative to the immediate section of the intermediate portion 110 from which the second portion 116 extends. In some examples, as shown in FIG. 4, the first portion 112 and the second portion 116 each defines a negative draft angle with the horizontal plane 118. Since the first portion 112 and the second portion 116 are both at positive draft angles, the preliminary structure 146 can be molded as a single structure and be removed from a corresponding mold, without breaking, cutting, or otherwise distorting the preliminary structure 146 or the corresponding mold.

In certain examples, the molded laminated structure 100, and thus the preliminary structure 146, has an additional layer or core interposed between the first outer layer 102 and the second outer layer 106. The additional layer or core is made of a different material or has a different structure than the first outer layer 102 and the second outer layer 106. In certain examples, the additional layer or core is a honeycomb core 128 or a core with a honeycomb structure. Referring to FIGS. 4 and 5, the honeycomb core 128 is interposed between the first outer layer 102 and the second outer layer 106, resulting in a honeycomb sandwich structure. The honeycomb sandwich structure of the preliminary structure 146 is illustrated in FIG. 4, which shows a sectional view of the preliminary structure 146 along line 4-4 of FIG. 2. The preliminary structure 146 includes a first outer layer 102, a honeycomb core 128, and a second outer layer 106. The second outer layer 106 is continuous across the entirety of the preliminary structure 146, including the first portion 112, intermediate portion 110 and the second portion 116. Moreover, the honeycomb core 128 and the first outer layer 102 are continuous across the entirety of the preliminary structure 146. The bend 125 of the intermediate portion 110 causes a bend in all the layers of the honeycomb sandwich structure forming the intermediate portion 110.

The honeycomb sandwich structure of the molded laminated structure 100 is further illustrated in FIG. 5, which shows a sectional view of the molded laminated structure 100 along line 5-5 of FIG. 1. Like the preliminary structure 146, the molded laminated structure 100 includes a first outer layer 102, a honeycomb core 128, and a second outer layer 106. The second outer layer 106 is continuous across the entirety of the sectional view of the molded laminated structure 100, including the first portion 112, intermediate portion 110, and the second portion 116. The second outer layer 106 is also continuous across an entirety of the intermediate portion 110 along the groove 122 as the groove 122 is not formed in the second outer layer 106. The first outer layer 102 and the honeycomb core 128, however, are not continuous across the entirety of the molded laminated structure 100 as the groove 122 is cut into the first outer layer 102 and at least partially into the honeycomb core 128.

Figure 7:
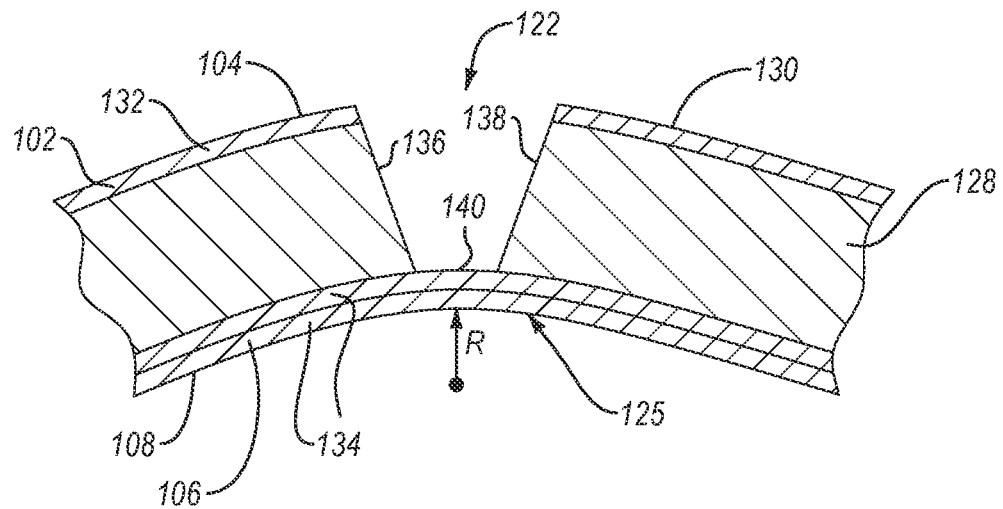
FIG. 7 is a cross-sectional side view of a groove machined into a molded laminated structure, taken along a line similar to the line 4-4 of FIG. 2, to expose a section of an outer layer of the molded laminated structure, according to one or more examples of the present disclosure.
Figure 8:
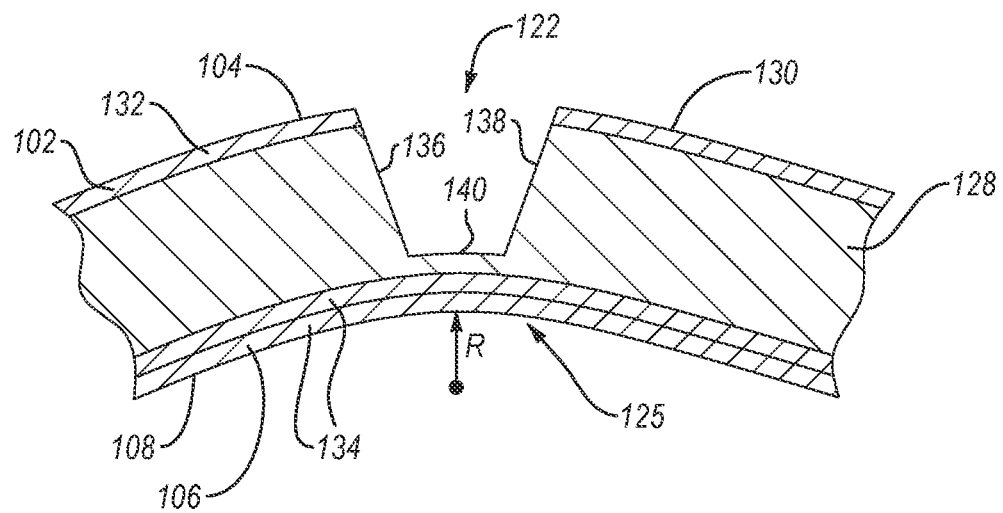
FIG. 8 is a cross-sectional side view of a groove machined into a molded laminated structure, taken along a line similar to the line 4-4 of FIG. 2, to expose a section of a honeycomb core of the molded laminated structure, according to one or more examples of the present disclosure.

As will be explained in more detail, as shown in FIG. 5, the preliminary structure 146 has been folded at the bend 125 to bring the first portion 112 to the first negative draft angle 114 and the second portion 116 to the second negative draft angle 120 to form the molded laminated structure 100. Folding the preliminary structure 146 into the molded laminated structure 100 at least partially closes the groove 122 (see, e.g., FIGS. 7 and 8 compared to FIG. 5).

Figure 3:
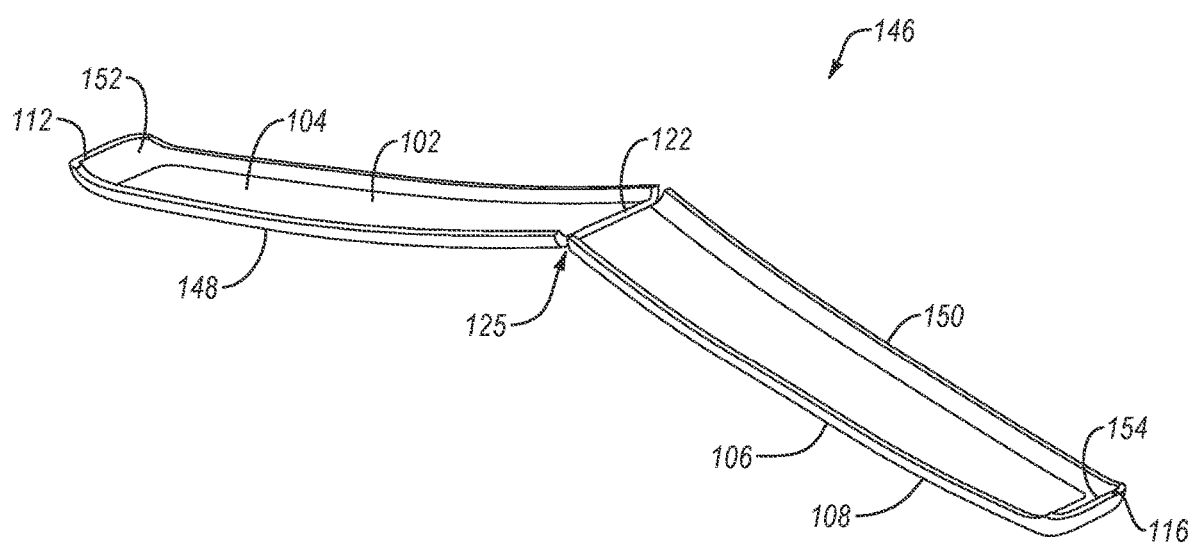
FIG. 3 is a perspective view of the preliminary structure of FIG. 2 with a groove machined into the preliminary structure, according to one or more examples of the present disclosure.

Referring to FIG. 3, the groove 122 has been machined into the preliminary structure 146 after the preliminary structure 146 is formed. The groove 122 is formed in the first outer layer 102 and extends across an entirety of the width of the intermediate portion 110 at the bend 125. The groove 122 is machined to a constant cross-section of the second outer layer 106. In other words, the groove 122 is machined into a portion of the second outer layer 106 forming any sidewalls (e.g., sidewalls 159 of FIG. 6) of the intermediate portion 110, but the groove 122 does not extend into the portion of the second outer layer 106 forming the relatively planar portion of the intermediate portion 110, such that the second outer layer 106 maintains a continuous and constant cross-section along the groove 122. In some examples, the constant cross-section of the second outer layer 106 is a flat or planar surface which allows the preliminary structure 146 to be folded at the bend 125. As the preliminary structure 146 has not yet been folded at the bend 125, the first portion 112 and the second portion 116 are at a first positive draft angle 152 and a second positive draft angle 154, respectively, when the groove 122 is formed.

Figure 6:
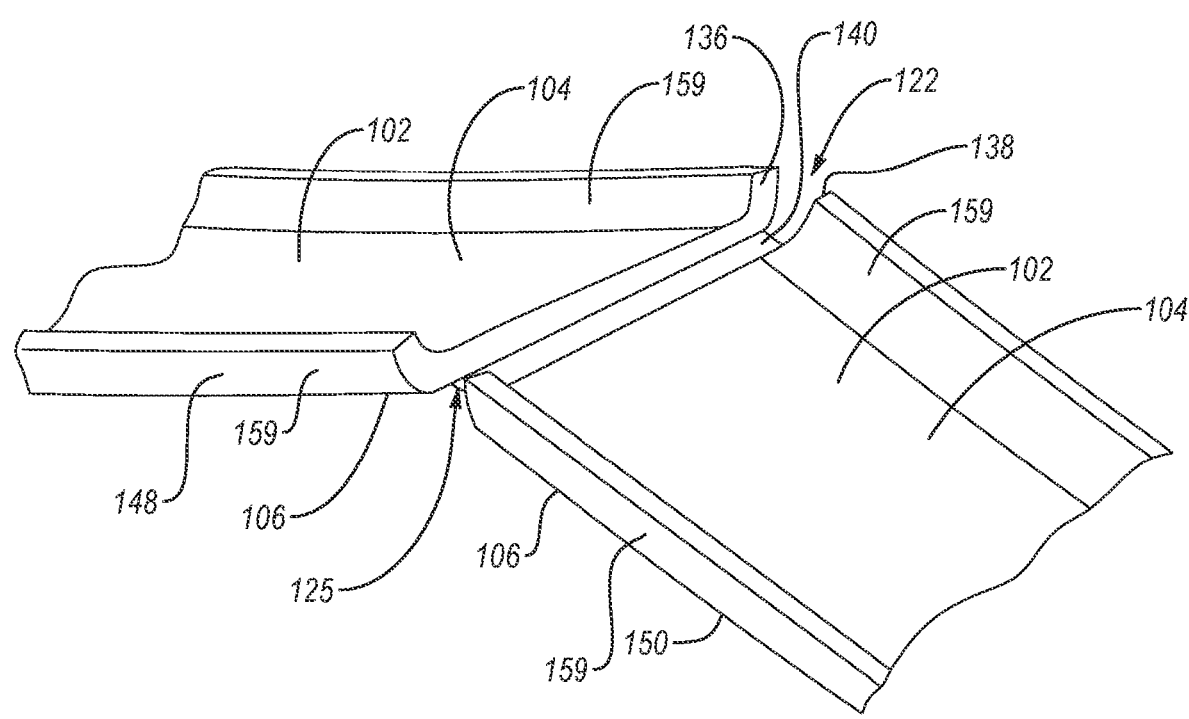
FIG. 6 is a perspective view of a groove machined into the molded laminated structure, according to one or more examples of the present disclosure.

FIG. 6 shows a closer view of the groove 122 according to certain examples. The groove 122 has (or is defined by) a first wall 136 and a second wall 138 that extends from the first outer surface 104 and through the first outer layer 102. The first wall 136 is on an opposite side of the cross-section of the groove 122 as the second wall 138. In one example, illustrated in FIGS. 5 and 6, the groove 122 further has (or is further defined by) an exposed section 140 of the second outer layer 106, extending between the first wall 136 and the second wall 138. The first wall 136 and the second wall 138 are angled or slanted in opposite directions from each other to form a cross-sectional shape of the groove 122 that tapers toward the second outer layer 106. In one example, the groove 122 has a conical-frustum shaped cross-section along the line 4-4. When the preliminary structure 146 is folded along the bend 125, the first wall 136 and the second wall 138 rotate toward each other. The taper of the first wall 136 and the second wall 138 allow the first wall 136 and the second wall 138 to be rotated toward each other, and the preliminary structure 146 to be shaped into the molded laminated structure 100 without the first wall 136 and the second wall 138 hitting or compressing against each other, or otherwise restricting the folding of the preliminary structure 146 into the molded laminated structure 100. Alternatively, in some examples, the first wall 136 and the second wall 138 may be parallel to each other. However, in such examples, the groove 122 should be wide enough to allow the preliminary structure 146 to be folded at the bend 125 without first wall 136 and the second wall 138 interfering with each other.

In some examples, as mentioned above and shown in FIG. 6, the intermediate portion 110 includes sidewalls 159 adjacent to the groove 122 of the first section 148 and the second section 150 that define a curved skirt of the intermediate portion 110. The first wall 136 of the groove 122 cuts through and includes a portion of the sidewalls 159 of the first section 148 and the second wall 138 of the groove 122 cuts through and includes the sidewalls 159 of the second section 150. In some examples, all the layers of the molded laminated structure 100 at these sidewalls 159 are machined into and/or through by the groove 122, including the second outer layer 106, until the groove 122 reaches a constant cross-section of the second outer layer 106. The constant cross-section of the second outer layer 106 of the preliminary structure 146, remaining after the groove 122 is formed, allows the first section 148 and the second section 150 to be rotated toward each other along the bend 125 or the folding joint 124 while maintaining interconnectivity between the first section 148 and the second section 150, thus maintaining proper alignment between the first section 148 and the second section 150. Additionally, because the second outer layer 106 is relatively thin, compared to the overall thickness of the preliminary structure 146, there is enough flexibility in the second outer layer 106 to facilitate slight deformation of the second outer layer 106, which allows the first section 148 and the second section 150 to be rotated toward each other. Moreover, the continuous or unitary nature of the second outer layer 106 from the first section 148 to the second section 150 improves the overall strength of the molded laminated structure 100.

Referring to FIG. 7, a sectional view of the molded laminated structure 100 at the groove 122, according to some examples, is shown. The first outer layer 102 is shown to be a single ply of material 132. However, in other examples, the first outer layer 102 could have any number of plies, and have any of various thicknesses, as desired because the first outer layer 102 is cut by the groove 122 and does not need to facilitate bending. The second outer layer 106 is shown in FIG. 7 to have two plies of material 134. However, in other examples, the second outer layer 106 could have one or more than two plies of material 134, and have any of various thicknesses, but the number of plies and/or the thicknesses of the plies are limited to facilitate bending of the preliminary structure 146 into the molded laminated structure 100. Ideally, when the second outer layer 106 is a glass-fiber-reinforced polymeric material, the second outer layer 106 is 4 plies of material or less. In certain examples, depending on the thicknesses of the plies, more than 4 plies of a glass-fiber-reinforced polymeric material may make the second outer layer 106 too stiff and therefore too difficult to bend.

As shown in FIG. 7, the exposed section 140 of the second outer layer 106 of the groove 122 of the preliminary structure 146 is radiused. In other words, the second outer layer 106 at the groove 122 is radiused. It may be desirable to minimize the radius R of the exposed section 140 of the preliminary structure 146 to reduce the amount of post-molding work that is needed to be performed on the molded laminated structure 100. A minimized radius R may help to reduce the amount of sweeping and sanding, or other surface smoothing processes, needed to smooth out the second outer layer 106. However, if the radius R is too small it is possible that the second outer layer 106 could tear during molding or bending. Therefore, the radius R is selected that allows the second outer layer 106 to bend while maintaining enough strength to avoid tearing the second outer layer 106. In one example, the radius R is at least 7 times the thickness of the second outer layer 106. In another example, the radius R is no more than 10 times the thickness of the second outer layer 106.

In some examples, the second outer layer 106 has two plies where one ply is 0.0045 inches thick and the other ply is 0.011 inches thick for a total thickness of the second outer layer 106 of 0.0155 inches. In one example, the maximum radius R of the exposed section 140 is 10 times the total thickness of the second outer layer 106 or 0.155 inches. In another example, the minimum radius R of the exposed section 140 is 7 times the thickness of the second outer layer 106 or 0.1085 inches. The minimum radius R of the exposed section 140 can also be calculated based on the thickness of the thickest ply of the second outer layer 106 and is at least 10 times the thickness of the thickest ply or 0.1100 inches in some examples. Therefore, the optimal radius R is between 0.1100+/−0.002 inches and 0.155 inches in certain examples.

As shown in FIG. 8 and mentioned above, in some examples, the groove 122 may be machined partially through the honeycomb core 128, leaving an exposed section 140 of honeycomb core 128 between the first wall 136 and the second wall 138. The exposed section 140 of honeycomb core 128 may promote adhesion of the adhesive 126 within the groove 122. In one example, the thickness of the exposed section 140 of the honeycomb core 128 is 0.030 inches. Accordingly, in certain examples, the total thickness of the honeycomb core 128 and the second outer layer 106 is 0.0455 inches. However, as used herein, only the thickness of the second outer layer 106 is used when calculating the radius R.

Figure 9:
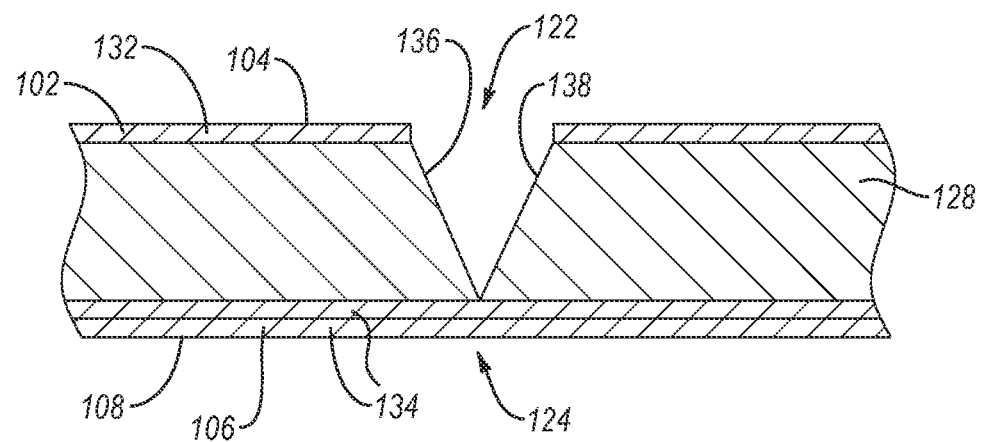
FIG. 9 is a cross-sectional side view of a V-shaped groove machined into a molded laminated structure, taken along a line similar to the line 4-4 of FIG. 2, according to one or more examples of the present disclosure.

Referring to FIG. 9, in some examples, the groove 122 has a V-shaped cross-section. The groove 122 has a first wall 136 that extends from the first outer surface 104 and through the first outer layer 102 and a second wall 138, opposite of the first wall 136, that extends from the first outer surface 104 and through the first outer layer 102. The first wall 136 and the second wall 138 are slanted at opposite directions to form a V-shape. When the preliminary structure 146 is folded along the folding joint 124, the groove 122 is partially closed and the cross-section of the groove 122 of the molded laminated structure has a second smaller, or more narrow, V-shape different from the first V-shape of the groove 122 of the preliminary structure 146. Alternatively, in other examples, the groove 122 of the preliminary structure 146 can completely close, to bring the first wall 136 and the second wall 138 in direct contact with each other, as the preliminary structure 146 is formed into the molded laminated structure 100. As shown, the base of the V-shape of the groove 122 in FIG. 9 extends through the honeycomb core 128 and up to the second outer layer 106. However, in some examples, the base of the V-shape of the groove 122 extends only partially into the honeycomb core 128.

Figure 10:
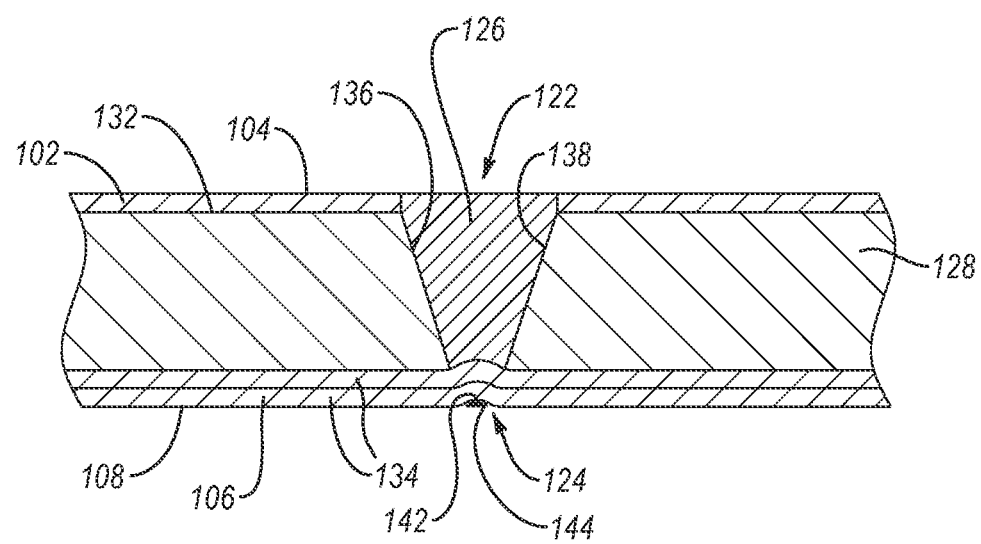
FIG. 10 is a cross-sectional side view of the groove of FIG. 7, filled with an adhesive and a notch filled with a filler material, according to one or more examples of the present disclosure.
Figure 11:
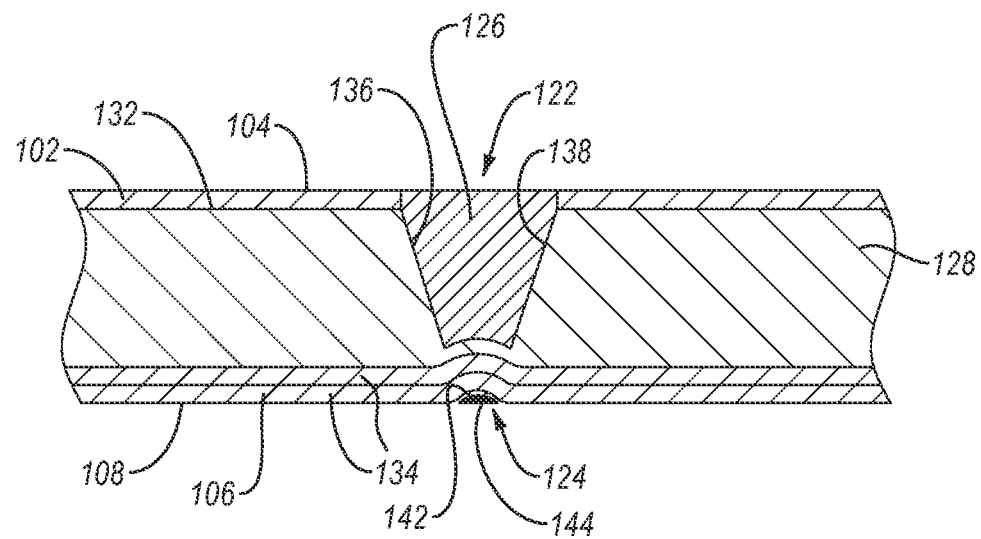
FIG. 11 is a cross-sectional side view of the groove of FIG. 8, filled with an adhesive and a notch filled with a filler material, according to one or more examples of the present disclosure.

As shown in FIGS. 10 and 11, the adhesive 126 can be various adhesives or bonding agents, such as an epoxy, capable of filling the groove 122 and retaining the first section 148 relative to the second section 140 after folding the preliminary structure 146 to form the final shape of the molded laminated structure 100. In certain examples, the adhesive 126 is a curable adhesive that is cured to harden the adhesive 126 for retaining the first section 148 relative to the second section 140. According to some examples, the molded laminated structure 100 further includes a notch 142 formed in the second outer surface 108 and extending across the entirety of the intermediate portion 110 along the folding joint 124. The notch 142 is beneath the exposed section 140 of the second outer layer 106 and corresponds to the radius R of the exposed section 140. Since the second outer layer 106 is relatively thin, the second outer layer 106 naturally curves in towards the exposed section 140 as the molded laminated structure 100 is folded along the folding joint 124. The notch 142 causes the second outer surface 108 to be uneven after the molded laminated structure 100 has been folded. Therefore, in some examples, the molded laminated structure 100 further includes a filler material 144 within the notch 142 to smooth the second outer surface 108.

Figure 12:
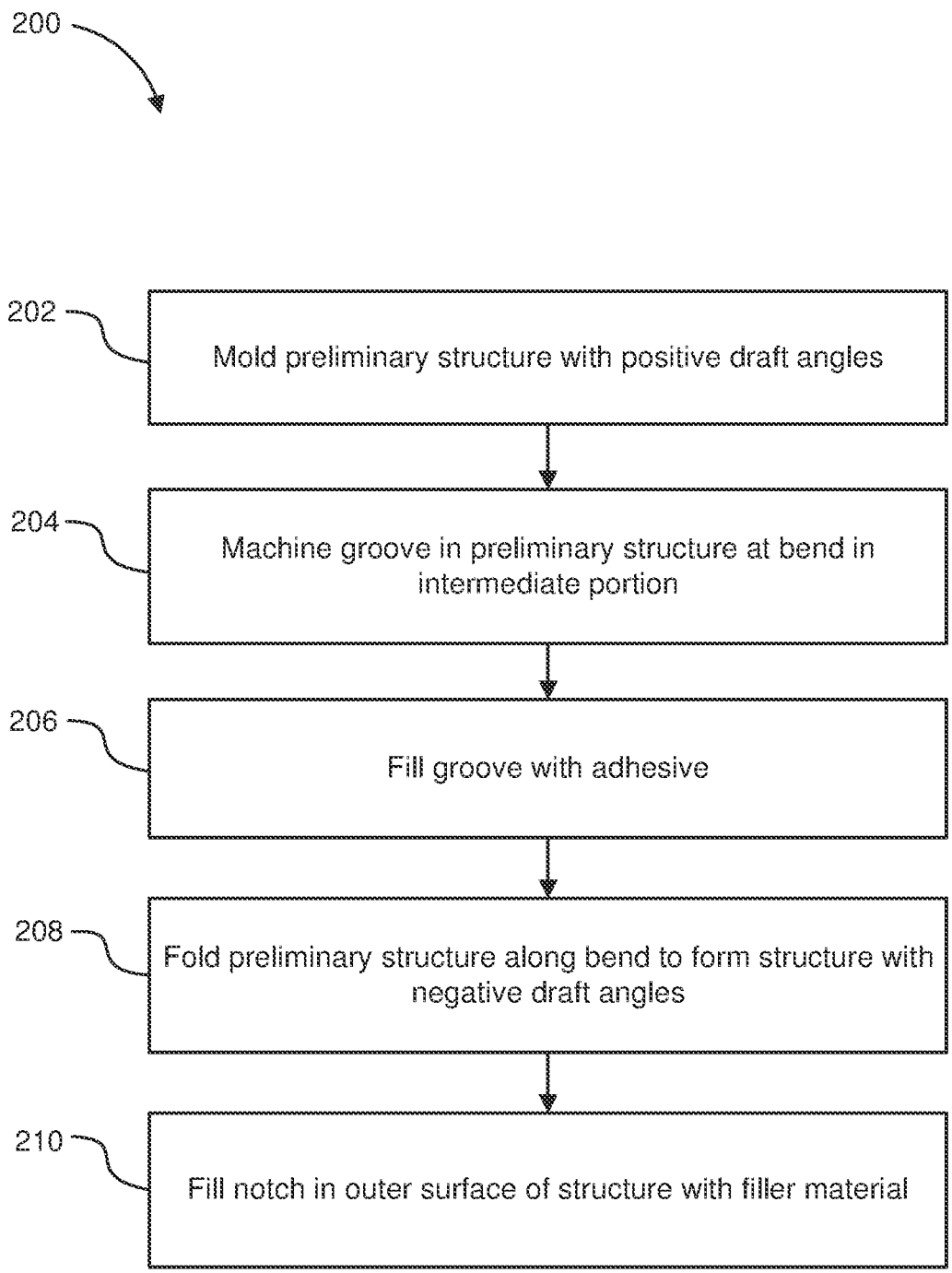
FIG. 12 is a schematic flow diagram of a method of manufacturing a molded laminated structure, according to one or more examples of the present disclosure.

Now referring to FIG. 12, according to certain examples, a method 200 of manufacturing the molded laminated structure 100 is shown. The method 200 includes (block 202) molding the preliminary structure 146 with opposing positive draft angles. The preliminary structure 146 is molded with the intermediate portion 110 having the bend 125 that divides the intermediate portion 110 into two sections. In some examples, the bend 125 divides the intermediate portion 110 into two symmetrical sections, such as the first section 148 and the second section 150. However, the bend 125 can be located at any location along the intermediate portion 110 depending on the shape and contours of the final structure. The preliminary structure 146 is molded with the bend 125 so the first portion 112 and the second portion 116 are at positive draft angles, allowing the preliminary structure 146 to be removed from a corresponding mold.

The method 200 also includes (block 204) machining the groove 122 in the preliminary structure 146 at the bend 125 in the intermediate portion 110. The groove 122 extends through the first outer layer 102, but is not formed in a constant cross-section of the second outer layer 106. The constant cross-section of the second outer layer 106 is a flat or near flat surface, in some examples, that allows the preliminary structure 146 to be folded about the bend 125. The method also includes (block 206) filling the groove 122 with the adhesive 126. The method further includes (block 208) folding the preliminary structure 146 at the bend 125 to shape the preliminary structure 146 into the molded laminated structure 100 with opposing negative draft angles. The intermediate portion 110 is folded at the bend 125 to at least partially close the groove 122 and bring the first portion 112 and the second portion 116 to the desired negative draft angles. After the preliminary structure 146 is folded, and before or after the groove 122 is filled with the adhesive 126, the method additionally includes (block 210) filling the notch 142 in the outer surface of the molded laminated structure 100 with the filler material 144. The notch 142 is formed in the outer surface as a result of folding the preliminary structure 146. The filler material 144 is filled within the notch 142 to smooth the outer surface and cover the folding joint 124 on the second outer surface 108.

Although not depicted, tools, such as molds and clamps, may be used to help maintain the alignment of the molded laminated structure 100 during any drying and/or curing processes of the adhesive 126.

In the above description, certain terms may be used such as "up," "down," "upper," "lower," "horizontal," "vertical," "left," "right," "over," "under" and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A molded laminated structure comprising:
   a first outer layer, defining a first outer surface;
   a second outer layer, defining a second outer surface, wherein the first outer surface is opposite the second outer surface;
   a core, interposed between the first outer layer and the second outer layer;
   an intermediate portion;
   a first portion, extending from the intermediate portion at a first negative draft angle relative to a horizontal plane;
   a second portion, extending from the intermediate portion towards the first portion at a second negative draft angle relative to the horizontal plane, wherein the first portion and the second portion are at opposite ends of the intermediate portion and the first portion extends towards the second portion;
   a groove formed in the first outer layer and in the core, and extending in a linear path across an entirety of the intermediate portion along a folding joint between the first portion and the second portion, wherein the groove is not formed in a constant cross-section of the second outer layer such that the second outer layer is continuous across a constant cross-section of the intermediate portion along the groove, wherein the groove divides the first outer layer into two sections and divides the core into two sections, and wherein the groove is large enough so that the two sections of the first outer layer are not in contact with each other and the two sections of the core are not in contact with each other; and
   an adhesive filling the groove.

2. The molded laminated structure of claim 1, wherein the groove further comprises:
   a first wall, extending from the first outer surface and through the first outer layer;
   a second wall, opposite the first wall, and extending from the first outer surface and through the first outer layer; and
   an exposed section of the second outer layer between the first wall and the second wall.

3. The molded laminated structure of claim 2, wherein the first wall is angled, at an oblique angle, relative to the second wall.

4. The molded laminated structure of claim 2, wherein a cross-section of the groove, along a plane perpendicular to the folding joint, has a conical-frustum shape.

5. The molded laminated structure of claim 1, wherein the first outer layer and the second outer layer each comprises a fiber-reinforced polymeric material.

6. The molded laminated structure of claim 5, wherein the second outer layer comprises four or less plies of fiber-reinforced polymeric material.

7. The molded laminated structure of claim 5, wherein the first outer layer and the second outer layer each comprises one of a glass-fiber-reinforced polymeric material or a carbon-fiber-reinforced polymeric material.

8. The molded laminated structure of claim 1, wherein the molded laminated structure is an aircraft structure.

9. The molded laminated structure of claim 1, wherein the groove extends through an entirety of a thickness of the core.

10. The molded laminated structure of claim 1, wherein the groove extends through only a portion of a thickness of the core.

11. The molded laminated structure of claim 1, wherein the second outer layer defines a portion of the groove.

12. The molded laminated structure of claim 1, wherein the second outer layer defines an outwardly-facing decorative surface.

13. The molded laminated structure of claim 1, wherein the folding joint is parallel to the first portion and the second portion.

14. The molded laminated structure of claim 1, wherein:
   the intermediate portion comprises sidewalls on opposite sides of the intermediate portion;
   the sidewalls define a skirt of the molded laminated structure; and
   the groove extends entirely through the sidewalls.

15. A molded laminated structure comprising:
   a first outer layer, defining a first outer surface;
   a second outer layer, defining a second outer surface, wherein the first outer surface is opposite the second outer surface;
   an intermediate portion;
   a first portion, extending from the intermediate portion at a first negative draft angle relative to a horizontal plane;
   a second portion, extending from the intermediate portion towards the first portion at a second negative draft angle relative to the horizontal plane, wherein the first portion and the second portion are at opposite ends of the intermediate portion and the first portion extends towards the second portion;
   a groove formed in the first outer layer and extending across an entirety of the intermediate portion along a folding joint between the first portion and the second portion, wherein the groove is not formed in a constant cross-section of the second outer layer such that the second outer layer is continuous across a constant cross-section of the intermediate portion along the groove;

an adhesive filling the groove;

a notch, formed in the second outer surface and extending across an entirety of the intermediate portion along the folding joint; and a filler material, within the notch.

16. The molded laminated structure of claim 15, wherein the second outer layer defines no portion of the groove.

17. The molded laminated structure of claim 15, wherein:

the adhesive is flush with the first outer surface of the first outer layer; and the filler material is flush with the second outer surface of the second outer layer.

18. A molded laminated structure comprising:

a first outer layer, defining a first outer surface;

a second outer layer, defining a second outer surface, wherein the first outer surface is opposite the second outer surface;

an intermediate portion;

a first portion, extending from the intermediate portion at a first negative draft angle relative to a horizontal plane;

a second portion, extending from the intermediate portion towards the first portion at a second negative draft angle relative to the horizontal plane, wherein the first portion and the second portion are at opposite ends of the intermediate portion and the first portion extends towards the second portion;

a groove formed in the first outer layer and extending across an entirety of the intermediate portion along a folding joint between the first portion and the second portion, wherein the groove is not formed in a constant cross-section of the second outer layer such that the second outer layer is continuous across a constant cross-section of the intermediate portion along the groove;

an adhesive filling the groove; and a honeycomb core, interposed between the first outer layer and the second outer layer.

19. The molded laminated structure of claim 18, wherein the groove extends through an entirety of a thickness of the honeycomb core.

20. The molded laminated structure of claim 18, wherein the groove extends through only a portion of a thickness of the honeycomb core.

* * * * *